UNITED STATES PATENT OFFICE.

HORACE KOECHLIN, OF LÖRRACH, AND OTTO N. WITT, OF MÜLHAUSEN, GERMANY.

TREATMENT OF INDOPHENOLS.

SPECIFICATION forming part of Letters Patent No. 275,774, dated April 10, 1883.

Application filed August 10, 1882. (No specimens.)

*To all whom it may concern:*

Be it known that we, HORACE KOECHLIN, a citizen of the Republic of France, and resident at Lörrach, and OTTO N. WITT, a citizen of the Republic of Switzerland, and a resident of Mülhausen, Germany, have invented a new and useful Improvement in Dye-Stuffs, of which the following is a specification.

In United States Letters Patent No. 261,518, dated July 18, 1882, and No. 263,341, dated August 29, 1882, we have described a new dye-stuff to which we give the name of "indophenol," and have fully explained the manner of its production. We have now discovered that this dye-stuff may be transformed into a new and useful derivative by subjecting it to the influence of reducing agents. By these it is transformed into a colorless compound, to which we apply the name of "leuco-indophenol," and which possesses great affinities for the textile fibers. Wool, silk, or cotton may be easily saturated with it, either by dyeing or printing. They may then be passed through a bath containing an oxidizing agent—such as potassic chromate, bichromate, nitrate, or any compound equivalent to them—and which causes the blue indophenol to be regenerated from its leuco compound. By this means very fine and fast blue shades may be obtained in a simple and inexpensive manner.

To prepare leuco-indophenol we reduce the blue indophenol as obtained by our patented process into a fine paste by grinding it with water. We then add a reducing agent until a complete decoloration is effected. Any or either of the reducing agents familiar to chemists may be used, the effect being always the same. If reducing agents be used which only act in the presence of an alkali—such as grape-sugar or sodic sulphide—care should be taken to keep the mixture alkaline. If, on the contrary, an acid reducing agent be used, the mixture should be kept acid during the reaction.

To further explain our invention we will give two examples.

First example: Indophenol is ground up with water to a fine paste and sufficient water added to make it quite fluid. One part indophenol to ten of water is a good proportion. To this mixture is added sufficient caustic soda to make it quite alkaline. The whole is then gently heated on the water bath, and a concentrated solution of grape-sugar (or any other alkaline reducing agent) added until the liquid becomes of yellowish-green color. This bath may be used at once for dyeing. To obtain the free leuco compound from it, hydrochloric or other acid should be added, when the leuco-indophenol settles out as a gray precipitate, which may be filtered and washed.

Second example: One hundred pounds indophenol paste, containing twenty-five pounds of dry indophenol, are introduced into a wooden, enameled, or copper vessel, and well mixed with stannous oxide previously obtained by precipitation of forty pounds stannous chloride with sodic carbonate solution. To this mixture of blue indophenol with stannous oxide, ten pounds ordinary acetic acid are added, and the whole gradually heated to 60° to 70° centigrade, when complete reduction takes place and the mixture becomes gray. The leuco-indophenol thus formed may be collected on a filter, washed, and brought into commerce either dry or in the shape of a paste. Instead of tin salts, any other acid reducing agents may be used.

We do not limit ourselves to the use of the reducing agents named, nor to any given proportions, the principle of our invention being always the same—viz., the transformation of indophenol into a soluble colorless leuco compound and the regeneration of indophenol from this leuco compound after combining the latter with the textile fiber.

Our invention may be applied not only to the indophenol obtained from nitroso or amido-dimethylaniline and naphthol, but it holds good for the whole class of dye-stuffs capable of being formed by the new reaction which we have discovered; and we wish it to be understood that the new process described above may be successfully applied to all, or any, or either of the dyes of the indophenol type.

We are aware that colorless substances formed from coloring-matters by means of reducing agents, and from which the original color may be regenerated by oxidizing agents, are well known, and are usually termed by chemists "leuco bases" or "leuco compounds."

We therefore do not claim broadly the production of such compounds as of our invention.

We claim—

1. The method herein described of producing leuco-indophenol from indophenol by the reaction of alkaline or acid reducing agents upon the latter, substantially as herein described.

2. The product formed by the reaction of alkaline or acid reducing agents upon indophenol, designated as "leuco-indophenol," in the form of a solution, paste, or dry substance, substantially as herein described.

In testimony whereof we have signed our names to this specification in the presence of two subscribing witnesses.

HORACE KOECHLIN.
OTTO N. WITT.

Witnesses:
E. NÖLKING,
E. DE SALIS MAYENFOLD.